INFRARED ABSORPTION SPECTRUM OF JANIEMYCIN

Inventor
Edward Meyers
William Lawrence Parker
Frank Lee Weisenborn
Felix Edward Pansy
Pacifico Anthony Principe By Donald J. Perrella
Attorney

United States Patent Office 3,577,530
Patented May 4, 1971

3,577,530
JANIEMYCIN
Edward Meyers, East Brunswick, William Lawrence Parker, Brunswick, Frank Lee Weisenborn, Somerset, Felix Edward Pansy, Jamesburg, and Pacifico Anthony Principe, South River, N.J., assignors to E. R. Squibb & Sons, Inc., New York, N.Y.
Filed July 24, 1969, Ser. No. 844,342
Int. Cl. A61k 21/00
U.S. Cl. 424—118
7 Claims

ABSTRACT OF THE DISCLOSURE

The antibiotic janiemycin is obtained by the cultivation under controlled conditions, of *Streptomyces macrosporeus* ATCC 21388. Janiemycin is active against bacteria.

Figure 1:
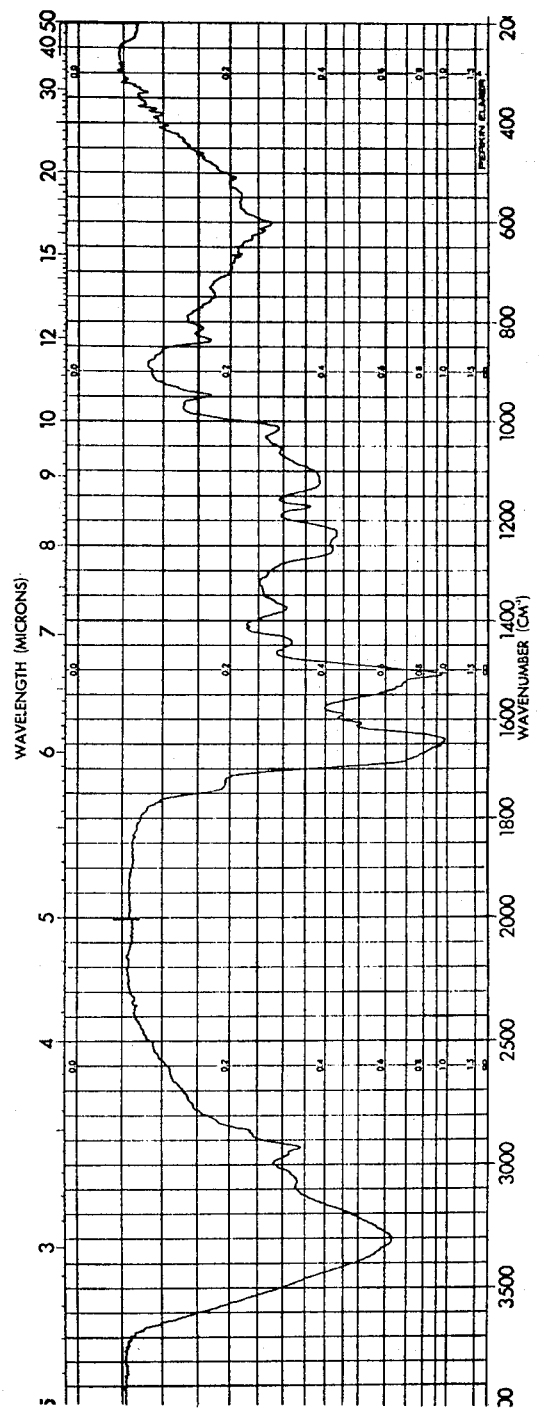

The present invention relates to a new and useful antibiotic and to a method for its production.

It is an object of the present invention to provide a new antibiotic. Another object is to provide a method for its preparation. These and other objects of the present invention will be apparent from the following description.

THE MICROORGANISM

The microorganism useful for the preparation of janiemycin is a species of *Streptomyces* hereinafter designated *Streptomyces macrosporeus* ATTC 21388. A culture of the living organism has been deposited, and made a part of the stock culture collection of, American Type Culture Collection (Rockville, Md.), from whence it is available; and it has been assigned the ATCC number 21388.

It is to be understood that the invention is not limited to the use of the particular organism described herein, but includes, inter alia, mutants produced from the described organism by mutating agents, such as, for example, X-rays, ultraviolet radiation and nitrogen mustards.

For isolating and characterizing the microorganism, a portion of the soil sample is shaken in sterile distilled water and plated on a nutrient agar containing 1% galactose. The medium contains:

| | Grams |
|---|---|
| Agar | 15 |
| Sucrose | 10 |
| Galactose | 10 |
| Citric acid | 1.2 |
| $(NH_4)_2HPO_4$ | 0.4 |
| KCl | 0.08 |
| $MgCl_2 \cdot 6H_2O$ | 0.418 |
| $MnCl_2 \cdot 4H_2O$ | 0.036 |
| $FeCl_3 \cdot 6H_2O$ | 0.023 |
| $ZnCl_3 \cdot 6H_2O$ | 0.021 |
| $CoCl_2 \cdot 6H_2O$ | 0.004 |

Distilled water to 1,000 ml.

The medium is adjusted to pH 7.0 and sterilized in an autoclave at 121° C. for 30 minutes. After seven to ten days incubation at 25° C., colonies of *Streptomyces macrosporeus* ATCC 21388 are isolated from the plated soil. These isolated colonies are then grown in a medium containing:

| | Grams |
|---|---|
| Beef extract | 1.5 |
| Yeast extract | 3.0 |
| Peptone | 6.0 |
| Dextrose | 1.0 |

Distilled water to 1,000 ml.

The medium is autoclaved at 121° C. for 15 minutes.

The organism is a member of the gray spore color series of Pridham. Spores are produced in chains on sporophores forming primitive to extended spirals. The spores are spiny and globose to sub-globose, as seen by electron microscopy. The cultural characteristics of *Streptomyces macrosporeus* ATCC 21388 are as follows:

Melanoid pigment is not produced on peptone-iron agar or other other organic media. Table 1 presents some growth characteristics of *Streptomyces macrosporeus* on standard media.

Janiemycin is a basic material and forms salts with anions. Examples of such anions are halides, acetates and sulfates.

TABLE 1
[Some growth characteristics of *Streptomyces macrosporeus* ATCC 21388]

| Media (1) | 7 days | 14 days |
|---|---|---|
| Yeast extract, malt extract agar. | Aerial mycelium white turning gray. Reverse: colorless. No soluble pigment. | Sporulation good, gray (2). Reverse: yellow-brown. No soluble pigment. |
| Oatmeal agar | Growth thin, colorless with white fringe, grayish center. Reverse: colorless. No soluble pigment. | Growth thin, sporulation light, grayish with radiating margin. Reverse: light yellowish-green. |
| Inorganic salts, starch agar | Aerial mycelium gray with fringe. Reverse: light olivaceous. | Sporulation gray (2) Reverse: yellow brown to greenish black (olivaceous). No soluble pigment. |
| Glycerol asparagine agar | No sporulation. Reverse: colorless. No soluble pigment. | Sporulation light gray (2). Reverse: colorless to light yellowish-brown. No soluble pigment. |

(1), (2)—See notes at end of specification.

*Streptomyces macrosporeus* ATCC 21388 is capable of utilizing the following carbon sources, when tested by the standard method of Pridham and Gottlieb: glucose, mannitol, inositol, xylose, arabinose, rhamnose, fructose, galactose and trehalose. Growth is not supported by sorbitol, raffinose, melibose, sucrose and lactose.

It weakly hydrolyzes starch, is moderately capable of hydrolyzing protein, and can hydrolyze calcium malate. The organism reduces nitrate and tolerates 9% saline.

THE ANTIBIOTIC

*Streptomyces macrosporeus* ATCC 21388 produces an antibiotic that possesses activity against bacteria. To form the antibiotic, *Streptomyces macrosporeus* ATCC 21388 is grown at 25° C. under submerged aerobic conditions in an aqueous nutrient medium containing an assimilable carbohydrate and nitrogen source. The fermentation is carried out for approximately 144 hours, at the end of which time the antibiotic has been formed.

After the fermentation is completed, filter aid is added to the broth which is then filtered. The antibiotic is extracted from the mycelial cake with methanol. The antibiotic is not in the mycelial cake exclusively, but is also found in the filtrate. Thus, the filtrate is extracted with water saturated n-butanol. Both butanolic and methanolic extracts are concentrated in vacuo, so that aqueous suspensions from each, result. These are combined and the pool extracted with water saturated n-butanol. The butanol layer is concentrated in vacuo to a minimal volume and the concentrate diluted with at least 10 volumes of acetone. The acetone insoluble precipitate which occurs is collected by either filtration or centrifugation and is dried in vacuo to yield an amorphous, light tan powder.

The acetone insoluble powder may be further purified by a four tube countercurrent distribution in n-butanol-$H_2O$. Most of the activity is found in the n-butanol phases of the first two tubes. Removal of the solvent gives an amorphous solid.

This material can be further purified by chromatography on silica gel eluting first with propanol-butanol and then with propanol-butanol-1 N $NH_4OH$. The latter solvent system eventually elutes the active material, an amorphous solid when free of solvent.

Further purification is achieved by chromatography on Sephadex G-50 in dimethylsulfoxide.

The invention may be further illustrated by the following examples.

EXAMPLE 1

Tomato paste-oatmeal agar slants are seeded with *Streptomyces macrosporeus* ATCC 21388. They are incubated 10–14 days and then used to inoculate 25 ml. of aqueous soybean meal contained in 125 ml. Erlenmeyer flasks. The composition of the germination medium is:

| | Grams |
|---|---|
| Soybean meal (Staley's 4S) | 15.0 |
| Dehydrated mashed potato | 15.0 |
| Glucose | 50.0 |
| $CoCl_2 \cdot 2H_2O$ | 0.005 |
| $CaCO_3$ | 10.0 |
| Agar | 2.5 |

Distilled water to 1,000 ml.

The medium is sterilized for 30 minutes at 121° C. and at 15 lbs. steam pressure. The germination flasks are incubated at 25° C. for 72–96 hours on a rotary shaker, operating at 280 r.p.m. with a 2-inch throw.

Fermentation conditions

A 5% (v./v.) transfer is made from the germination flask to 500 ml. Erlenmeyer flasks containing 100 ml. of the same medium used for the germination flasks, except that the agar is omitted. The fermentation flasks are incubated and agitated as are the germination flasks. Samples are taken at 4 and 6 days. They are examined after centrifuging off the mycelium and extracting the mycelium with a volume of methanol equal to that of the supernate. Both supernate and methanolic extracts are examined by paper chromatography and by bioassay. For chromatography, suitable amounts are spotted on sheets of Whatman 1 paper and the chromatograms developed with a solvent system of the following composition: n-butanol, water, acetic acid, 4:5:1 (v./v./v.). The upper phase of this solvent system is utilized as the solvent. In this system, janiemycin has an $R_f$ value of 0.13. The antibiotic is detected by bioautography against *Staphylococcus aureus* 209P.

EXAMPLE 2

A 30 liter batch of *Streptomyces macrosporeus* ATCC 21388 is fermented in a 38 liter stainless steel vessel with the media and operating conditions described below.

Stage 1

Inoculum: Culture of *Streptomyces macrosporeus* ATCC 21388 preserved by lyophilization in milk and grown out on a tomato paste-oatmeal agar slant. Surface growth from a slant is suspended into 11 ml. of 0.01% Dupanol solution, and three ml. of this suspension is used as the source of inoculum.

Medium:

| | Grams |
|---|---|
| Soybean meal (Staley's 4S) | 15.0 |
| Dehydrated mashed potato | 15.0 |
| Glucose | 50.0 |
| $CoCl_2 \cdot 2H_2O$ | 0.005 |
| $CaCO_3$ | 10.0 |
| Agar | 2.5 |

Distilled water to 1,000 ml.

50 ml. of this medium in a 250 ml. Erlenmeyer flask is incubated 96 hours on a rotary shaker at 25° C. The shaker operates at 280 r.p.m with a 2-inch throw.

Stage 2

Inoculum: 50 ml. from first stage.

Medium: Same as stage 1. 1000 ml. of medium and inoculum in a 4,000 ml. flask is incubated 96 hours at 25° C. on a reciprocating shaker. The shaker is operated at 120 strokes per minute with a 2-inch throw.

Stage 3

Inoculum: 2,000 ml. from stage 2.
Medium:

| | Grams |
|---|---|
| Soybean meal (Staley's 4S) | 30.0 |
| Cerelose | 20.0 |
| $CaCO_3$ | 10.0 |
| Ucon LB 625 | 0.5 |

Distilled water to 1,000 ml.

30 liters of the medium containing the inoculum is incubated for 144 hours. During incubation, the broth is agitated. It is also aerated at the rate of 1.0 foot/minute superficial air velocity for the first 12 hours and thereafter at 4.0 feet/minute superficial air velocity.

EXAMPLE 3

5.6 kilograms of filter aid (Hyflo) is added to 113 liters of pooled fermentation broth obtained as described in Example 2, and the insoluble material is removed by filtration to yield 26.6 kg. of mycelial cake.

EXAMPLE 4

The filter cake (26.6 kg.) obtained in Example 3 is extracted three times with 53 liter portions of methanol. The cake is filtered between extractions. The combined methanol extracts are concentrated in vacuo to 5 liters to remove the methanol. The resulting aqueous suspension is extracted once with a 6 liter portion of water saturated n-butanol and twice more with 2 liter portions of water saturated n-butanol.

EXAMPLE 5

The broth filtrate, 92 liters, obtained in Example 3, is adjusted to pH 7.0 with concentrated hydrochloric acid and extracted 3 times with 30 liter portions of water saturated n-butanol. The butanol layer (75 liters) is combined with the butanol layer (6 liters) obtained in Example 4. The pooled butanol fractions are concentrated in vacuo to remove butanol. The resulting aqueous suspension (6 liters) is again extracted with a 6 liter portion of water saturated n-butanol and twice more with 2 liter portions of water saturated n-butanol. The butanol layers are pooled to yield 10 liters of butanol extract. This extract is concentrated in vacuo to approximately 2 liters. Approximately 40 liters of acetone are added to the butanol concentrate, resulting in the appearance of an amorphous precipitate. The precipitate is collected by either filtration or centrifugation and dried in vacuo to constant weight (9.7 grams).

EXAMPLE 6

A portion, 5.55 g. [1900 dilution units per mg. (du./mg.) assayed by 2-fold tube dilution with *Staphylococcus aureus* 209P] of the acetone insoluble powder, such as prepared in Example 5, was dissolved in an equilibrated water-n-butanol mixture (100 ml. of each phase) and purified by a four tube counter current distribution with the lower phase moving. The quantities and activities of material in each phase were:

| Phase | Weight, g. | Activity ($S.$ $aureus$ 209P) |
|---|---|---|
| n-Butanol, tube: | | |
| 1 | 0.488 | [1] 5,100 |
| 2 | 0.500 | 4,200 |
| 3 | 0.245 | 1,100 |
| 4 | 0.231 | 220 |
| Water, tube: | | |
| 1 | 0.390 | 8 |
| 2 | 0.738 | 8 |
| 3 | 1.200 | 11 |
| 4 | 1.190 | 4 |
| Total | 4.982 | [2] $5 \times 10^5$ |

[1] Du./mg.
[2] Du.

The material of interest was mostly in the n-butanol phases of the first and second tubes.

EXAMPLE 7

Partial purification of janiemycin can be achieved by chromatography on silica gel. For example, 779 mg. of material that had been partially purified by solvent distribution as in Example 6 was dissolved in n-propanol/n-butanol (2:3) and placed on a column of 200 g. of silica gel made up in this solvent system. Elution with this system gave 183 mg. of material with low activity. Further elution with n-propanol/n-butanol/1.0 N $NH_4OH$ (2:3:4) gave an additional 80 mg. of weakly active material followed by 97 mg. of janiemycin rich material. The chromatography can be conveniently followed by the absorption of the effluent at 254 m$\mu$.

EXAMPLE 8

Janiemycin rich material, 76 mg., obtained by the procedure described in Example 7 was chromatographed in dimethylsulfoxide on a 2.5 x 80 cm. column of Sephadex G-50 (fine). The effluent was monitored at 254 m$\mu$ and fractions (ca. 1.7 ml. per fraction) containing active material were located by disc assay. Most activity was found in fractions 100-132 which correspond to a peak in the monitor curve centered at fraction 114. Fractions 100-132 were combined and taken to dryness in vacuo, giving 35 mg. of amorphous solid with an activity of 5500 du./mg.

EXAMPLE 9

Janiemycin rich material, 175 mg., obtained by the procedure described in Example 8 was further purified by preparative thin layer chromatography on silica gel, eluting with n-propanol/n-butanol/1-N ammonia (2:3:4). A band with $R_f$ 0.04-0.15 was collected and the antibiotic washed from the silica gel with the same solvent system. The solvent was removed and the residue was dissolved in dimethylsulfoxide. Addition of methanol precipitated the antibiotic. Reprecipitation as before gave 40 mg. of amorphous solid after drying in vacuo. Material prepared in this manner has an activity of 5000-6000 du./mg.

Analysis.—(percent): C, 47.49; H, 5.30; N, 13.07.

UV: $\lambda$ max. in 99% aq. dimethylsulfoxide 239, 272 m$\mu$, in 0.15 N ammonium hydroxide (pH~8) 253 m$\mu$.

$R_f$ [Whatman No. 1 filter paper, n-butanol-acetic acid-water (4:1:5)]: 0.13. [Whatman No. 1 filter paper, n-butanol-pyridine-water (4:3:7)]: 0.85.

The infra-red spectrum of janiemycin is shown in the attached drawing.

Electrophoresis at pH 3.3 in the presence of 30% formamide resolved three antibiotic components. Electrophoretic mobility values using Safranin O as cathodic indicator and apalon as electroosmotic indicator were calculated as +85, +44 and +12 for the components.

EXAMPLE 10

Two-fold tube dilution assays were done with several microorganisms. The antibiotic used in this study was equivalent in purity to the material obtained in Example 8 (fractions 100-132).

| Organism: | MIC (ug./ml.) |
|---|---|
| Staphylococcus aureus 209P | 0.12 |
| Streptococcus pyogenes C203 | 0.01 |
| Bacillus subtilis ATCC 6633 | 0.2 |
| Sarcina lutea ATCC 9341 | 0.16 |
| Diplococcus pneumoniae Type 3 ATCC 6303 | 0.12 |
| Escherichia coli ATCC 10536 | >100 |
| Candida albicans CBS 35H | >100 |
| Mycobacterium tuberculosis BCG SC*5516 | >25.0 |
| Trichomonas vaginalis SC 8560 | >25.0 |

*Squibb culture.

EXAMPLE 11

Mice were injected intraperitoneally with 1000 $LD_{50}$ doses of Streptococcus pyogenes C203, and 1 hour and 5 hours post-infection were given the antibiotic subcutaneously. The antibiotic used in this study was equivalent in purity to the material obtained in Example 8 (fractions 100-132). Approximately 0.5 mg./kg. of the antibiotic preparation were sufficient to protect 50% of the mice against death.

NOTES (1) These media are standard media used in Streptomyces taxonomy and are recommended by the International Streptomyces Project for standardizing culture descriptions. Their composition is given in "Methods for Characterization of Streptomyces Species" by E. B. Shirling and D. Gottlieb, International J. Syst. Bacteriol. 16: (3) 313-340 (1966).

(2) The precise color designation is light brownish gray (63) ISCC-NBS or color chip 3 fe in the Color Harmony Manual.

What is claimed is:

1. A process for producing janiemycin which comprises cultivating Streptomyces macrosporeus ATCC 21388 in an aqueous nutrient medium comprising an assimilable carbohydrate and an assimilable organic nitrogen source under submerged aerobic conditions, until substantial antibiotic activity is imparted to the medium.

2. A process according to claim 1 wherein the strain is cultivated at about room temperature.

3. A process according to claim 1 wherein the cultivation is continued over a period of several days.

4. A process according to claim 3 wherein the strain is cultivated at about 25° C.

5. A process according to claim 1 wherein the cultivation involves the steps of incubation and fermentation.

6. A process according to claim 5 wherein the fermentation takes about 6 days.

7. A substance effective in inhibiting the growth of bacteria, said substance selected from the group consisting of janiemycin and halide salts thereof, said janiemycin having the following approximate elemental analysis: C, 47.49%; H, 5.30%; and N, 13.07% and having an infrared absorption spectrum as shown in FIG. 1, an $R_f$ value about 0.13 in n-butanol-acetic acid-water in 4:1:5 ratio, an $R_f$ value about 0.85 in n-butanol-pyridine-water in 4:3:7 ratio, having components having electrophoretic mobility values using Safranin O as cathodic indicator and apalon as electroosmotic indicator of +85, +44 and +12 and wherein the UV spectrum in neutral solution has maxima at about 239 and at about 272 m$\mu$, and in basic solution has a maximum at about 253 m$\mu$.

References Cited

Miller, The Pfizer Handbook of Microbial Metabolites, McGraw-Hill Book Co., Inc., N.Y., 1961, pp. 394 and 397.

JEROME D. GOLDBERG, Primary Examiner

U.S. Cl. X.R.

195—80